US006618151B2

(12) United States Patent
Killpatrick et al.

(10) Patent No.: US 6,618,151 B2
(45) Date of Patent: Sep. 9, 2003

(54) RING LASER GYROSCOPE WITH OFFSET APERTURE

(75) Inventors: Joseph E. Killpatrick, Minneapolis, MN (US); Rodney H. Thorland, Shoreview, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/764,542

(22) Filed: Jan. 17, 2001

(65) Prior Publication Data

US 2003/0112441 A1 Jun. 19, 2003

(51) Int. Cl.[7] .............................................. G01C 19/66
(52) U.S. Cl. ......................................... 356/459; 372/94
(58) Field of Search ............................... 356/459, 467, 356/471, FOR 112; 372/94

(56) References Cited

U.S. PATENT DOCUMENTS 4,494,873 A * 1/1985 Perlmutter et al. ......... 356/467
5,495,335 A * 2/1996 Cote ........................... 356/459
5,663,792 A * 9/1997 Killpatrick et al. ......... 356/473
5,960,025 A * 9/1999 Thorland et al. ........... 372/107

* cited by examiner

Primary Examiner—Samuel A. Turner
(74) Attorney, Agent, or Firm—McDonnell Boehnen Hulbert & Berghoff

(57) ABSTRACT

A ring laser gyroscope (RLG) employs an offset aperture for attenuating undesired modes of laser propagation therein. The RLG includes a block having a ring laser cavity containing a lasing gas, the cavity being substantially in the shape of a polygon having at least three sides and at least three vertices formed by the intersection of sides of the polygonal cavity. At least three mirrors are provided, equal in number to the number of vertices and positioned at the vertices to create a resonant ring laser having a polygonal ring path in the shape of the polygon. An aperture is provided in the ring laser cavity for attenuating undesired modes of laser propagation in the polygonal ring path of the laser. The aperture has an axis that is horizontally offset from a central axis of the polygonal ring path of the laser.

6 Claims, 3 Drawing Sheets

RING LASER GYROSCOPE WITH OFFSET APERTURE

BACKGROUND OF THE INVENTION

The present invention relates to a ring laser gyroscope, and more particularly to an improved optical configuration in the ring laser gyroscope employing an offset aperture.

Ring laser gyroscope (RLG) devices for measuring angular rotation rates area known in the art. In these devices, two laser beams are generated in opposite directions around a closed loop path about the axis of rotation of the device. Rotation of the apparatus causes the effective path length for the two beams to change, thus producing a frequency difference between the two beams since the frequency of oscillation of the laser beams is dependent upon the length of the lasing path. The frequency difference between the beams causes a phase shift between the beams that changes at a rate proportional to the frequency difference. The interaction of the beams produces an interference fringe pattern which is observed to move with a velocity proportional to the rate of angular rotation of the device about the axis.

In the closed loop optical path of laser propagation, it is necessary to provide an aperture having a size that is sufficiently small so that the 10 laser mode (having two dots side-by-side) and the 01 laser mode (having two dots in a vertical stack) have significant losses from passing through the aperture and therefore do not oscillate and affect the frequency of the 00 laser mode (having a single centered dot). However, as the size of the aperture is reduced, the mirrors in the optical laser path must be more precisely positioned to enable proper operation of the device, which is a time and labor intensive process and therefore increases the total cost of the RLG. Therefore, previous RLG devices have been designed with this trade-off taken into account. It would be an improvement to the current state of the art to provide an RLG having an aperture design that reduces the precision necessary in mirror positioning without having an adverse effect on the optical performance of the device.

BRIEF SUMMARY OF THE INVENTION

The present invention is a ring laser gyroscope (RLG) employing an offset aperture for attenuating undesired modes of laser propagation therein. The RLG includes a block having a ring laser cavity containing a lasing gas, the cavity being substantially in the shape of a polygon having at least three sides and at least three vertices formed by the intersection of sides of the polygonal cavity. At least three mirrors are provided, equal in number to the number of vertices and positioned at the vertices to create a resonant ring laser having a polygonal ring path in the shape of the polygon. At least one aperture is provided in the ring laser cavity for attenuating undesired modes of laser propagation in the polygonal ring path of the laser. The aperture has an axis that is horizontally offset from a central axis of the polygonal ring path of the laser.

DETAILED DESCRIPTION

Figure 1:
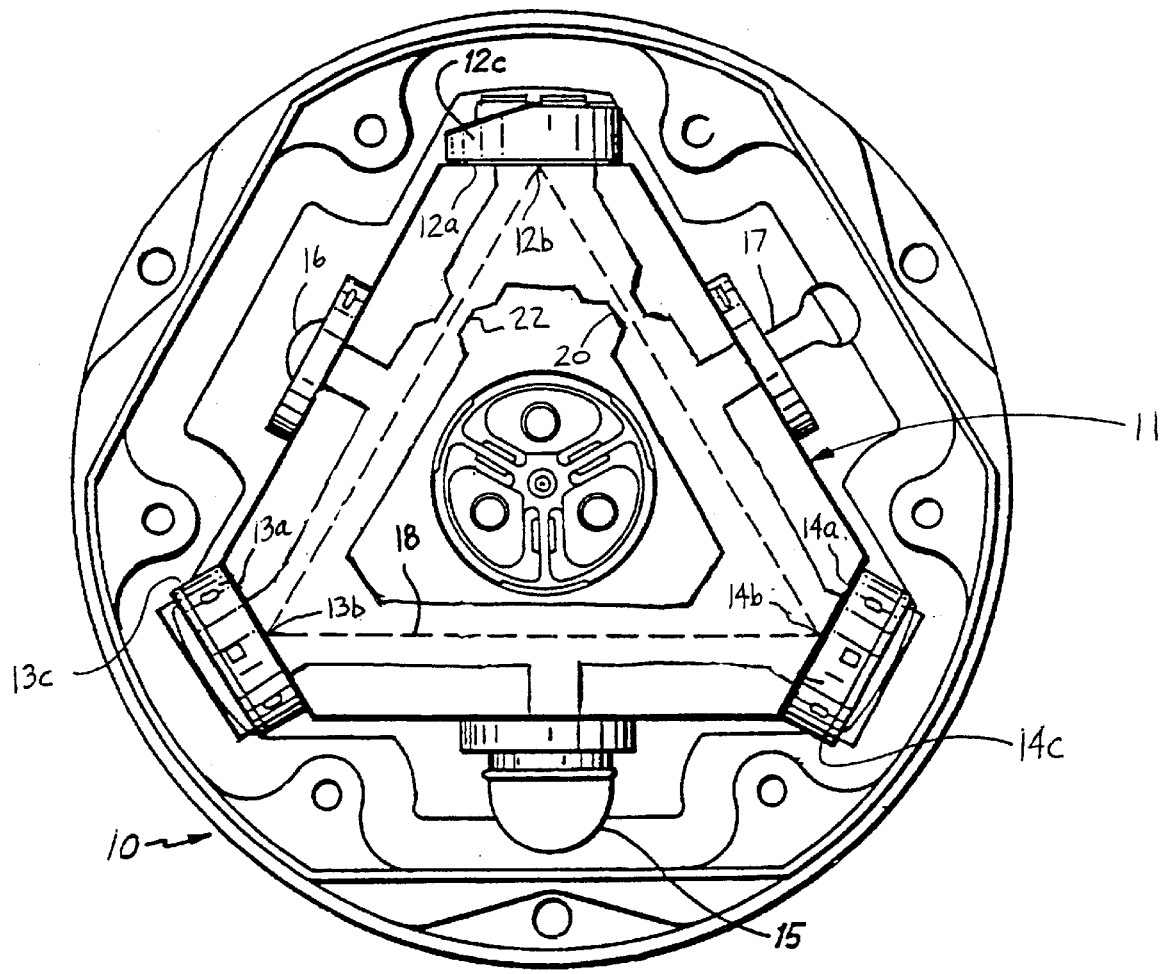
FIG. 1 is a diagram illustrating the optical laser path of an RLG as is known in the prior art.

FIG. 1 is a diagram illustrating the optical laser path of RLG 10 as is known in the prior art. RLG 10 includes laser block 11 in the form of a triangle. Laser block 11 provides a ring laser cavity containing lasing gas. Between block surfaces 12a, 13a and 14a is an optical laser path with vertices 12b, 13b and 14b at block surfaces 12a, 13a and 14a, respectively. Mirror assemblies 12c, 13c and 14c are mounted to block surfaces 12a, 13a and 14a, respectively. The ring laser cavity is filled with a lasing gas that is ignited or excited by a sufficient voltage between cathode 15 and each of anodes 16 and 17. In turn, a pair of counter-propagating laser beams travel along the optical laser path within the laser cavity as identified by reference numeral 18.

It should be noted that it is common practice in the art of RLGs to provide a pair of gas discharge currents through selected portions of the triangular laser block 11. Furthermore the pair of gas discharge currents are generally symmetrical along the ring laser cavity, with the polarity of the gas discharge currents being opposite.

This use of symmetrical and oppositely directed gas discharge currents obviates the effects of gas flow due to the gas discharge currents passing through the ring laser cavity which might otherwise result in performance errors.

In the triangular optical laser path illustrated in FIG. 1, the gas discharge currents flow in opposite directions, from anode 16 to cathode 15 and from anode 17 to cathode 15. These gas discharge currents generate the oppositely traveling laser beams that travel within laser block 11, passing through apertures 20 and 22. Apertures 20 and 22 are centered in laser propagation path 18, and are sufficiently narrow to eliminate the effects of the 10 and 01 modes of laser propagation. In one commercial embodiment, apertures 20 and 22 are circular in shape and have a diameter of 0.049 inches, which is sufficient to produce a 00 mode loss of 25 parts per million (PPM), a 10 mode loss of 150 PPM, and a 01 mode loss of 200 PPM. For this aperture size, mirrors 12c, 13c and 14c must be positioned in RLG 10 with extreme precision, since the height of the laser beam passed through apertures 20 and 22 is relatively small and the laser path must therefore be tightly controlled to achieve only the 25 PPM loss in the 00 mode of propagation.

Figure 2:
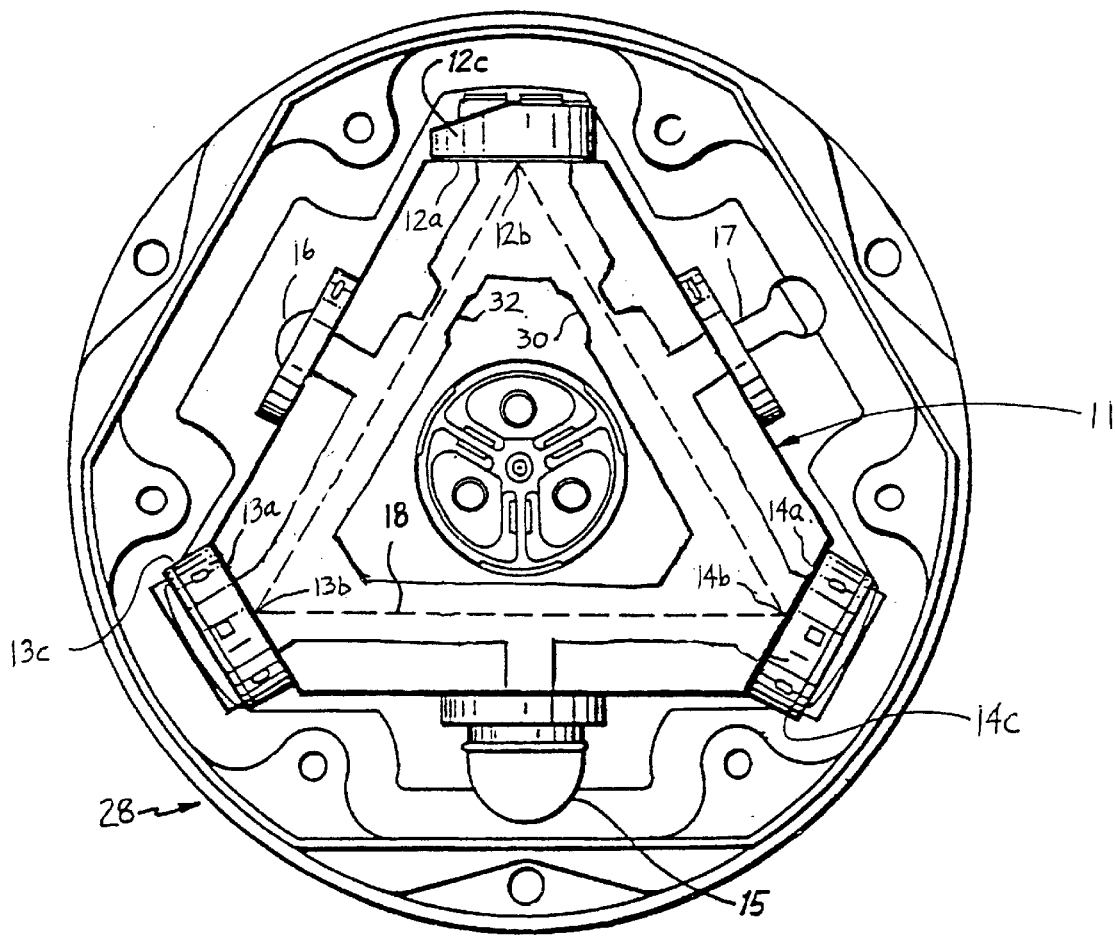
FIG. 2 is a diagram illustrating the optical laser path of an RLG according to the present invention.
Figure 3:
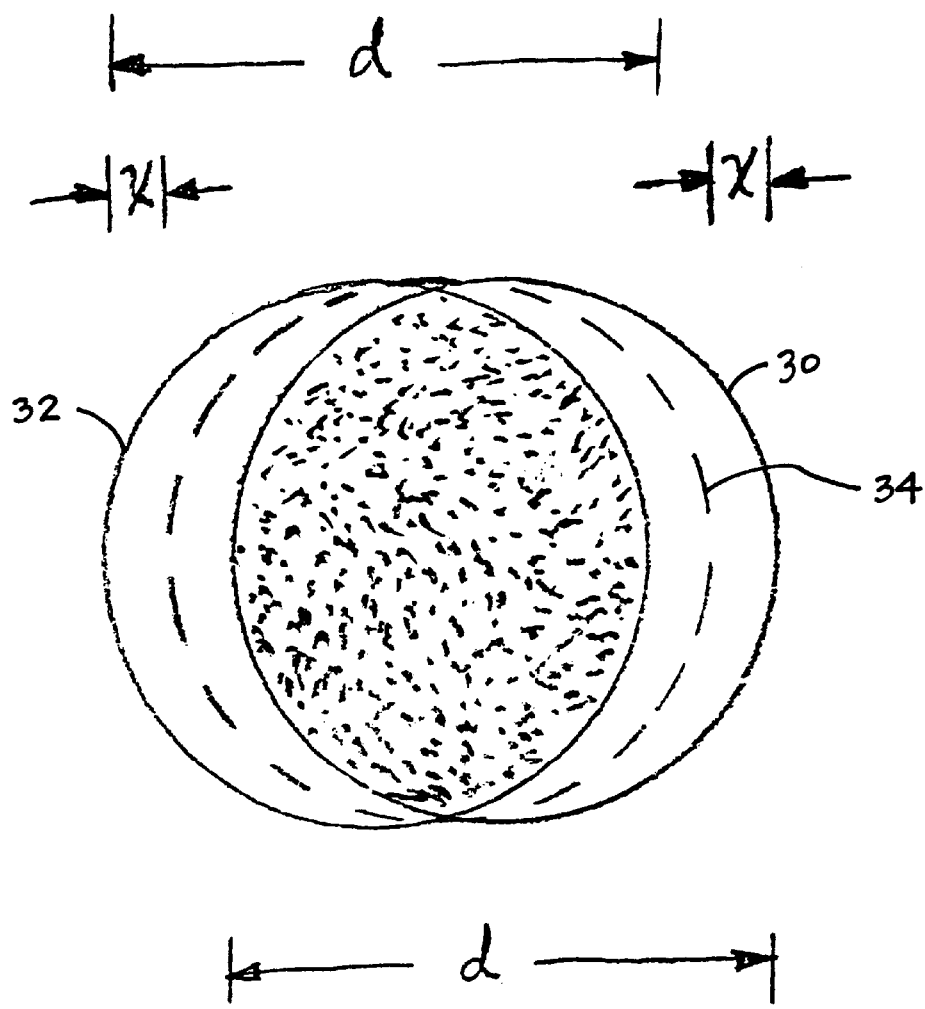
FIG. 3 is a diagram illustrating the aperture employed in the RLG according to the present invention.

FIG. 2 is a diagram illustrating the optical laser path of RLG 28 according to the present invention. All of the components of RLG 28 are identical to those of RLG 10 shown in FIG. 1 except for apertures 30 and 32 of RLG 28. Unlike symmetrical apertures 20 and 22 (FIG. 1), apertures 30 and 32 are offset in optical laser path 18, and are slightly larger than apertures 20 and 22 utilized in the prior art. Apertures 30 and 32 therefore create an optical pattern as shown in FIG. 3, where phantom line 34 depicts the centered aperture position and the filled-in portion represents the shape of the laser beam that is passed through apertures 30 and 32. Apertures 30 and 32 have a diameter d and have a horizontal offset x, as shown in FIG. 3. In an exemplary embodiment, diameter d is increased from 0.049 inches to 0.052 inches, and horizontal displacement x is equal to 0.003 inches. In other alternate embodiments, further one-to-one increases in both aperture size and displacement may be made to realize the offset aperture of the present invention. Because of the triangular cavity with spherical curved mirrors, the shape of the effective laser beam propagated in the 00 mode through apertures 30 and 32 has a somewhat elliptical shape, with a height slightly greater (about 4% greater in an exemplary embodiment) than its width. With this configuration, the 00 mode loss is lowered to less than about 25 PPM, the 10 mode loss is maintained at about 150 PPM, and the 01 mode loss is reduced from about 200 PPM to about 100 PPM, which is sufficient to eliminate the effects of the 01 and 10 modes (as well as higher modes). The primary advantage of the configuration shown in FIGS. 2 and 3 is that the increased aperture height significantly reduces the time, effort and cost of precisely positioning the mirrors of the RLG, a process which is commonly referred to as "mirror moves." In fact, utilizing the offset aperture design of the present invention virtually eliminates the need for mirror moves, which results in substantial time and cost savings in producing the RLG system, while retaining acceptable performance characteristics with respect to 00, 10 and 01 mode losses.

The invention has been described and shown in FIGS. 2 and 3 with two enlarged and horizontally offset apertures 30 and 32. However, in one preferred embodiment, only one of apertures 30 and 32 needs to be horizontally offset, while the other of apertures 30 and 32 may be increased to a diameter of about 0.058 inches, for example, such that it imposes no additional losses. Because RLG 28 (FIG. 2) utilizes a polygonal laser path having an odd number of sides (there are three sides in the triangular laser path of RLG 28), a single horizontally displaced aperture has the exact effect shown in FIG. 3, with the aperture appearing horizontally displaced in one direction for a first pass of the laser beam and in the opposite direction for a second pass of the laser beam.

Although the present invention has been described with reference to preferred embodiments, workers skilled in the art will recognize that changes may be made in form and detail without departing from the spirit and scope of the invention.

The embodiments of the invention in which an exclusive property or right is claimed are defined as follows:

1. A ring laser gyroscope comprising:
    a block having a ring laser cavity containing a lasing gas, the cavity being substantially in the shape of a polygon having at least three sides and at least three vertices formed by the intersection of sides of the polygonal cavity;
    at least three mirrors, equal in number to the number of vertices and positioned at the vertices to create a resonant ring laser having a polygonal ring path in the shape of the polygon, the polygonal ring path of the laser having a central axis; and
    a first aperture in the ring laser cavity for attenuating undesired modes of laser propagation in the polygonal ring path of the laser, the first aperture having an axis that is horizontally offset from the central axis of the polygonal ring path of the laser.

2. The ring laser gyroscope of claim 1, further comprising a second aperture in the ring laser cavity for attenuating undesired modes of laser propagation in the polygonal ring path of the laser, the second aperture having an axis that is horizontally offset from the central axis of the polygonal ring path of the laser in a direction opposite to the offset of the first aperture from the central axis of the polygonal ring path of the laser.

3. The ring laser gyroscope of claim 2, wherein the first and second apertures are circular and have a diameter of 0.052 inches, and the axes of the first and second apertures are horizontally offset in opposite directions from the central axis of the polygonal ring path of the laser by 0.004 inches.

4. The ring laser gyroscope of claim 1, wherein losses of laser propagation in a desired 00 mode are about 25 parts-per-million (PPM), losses of laser propagation in an undesired 10 mode are about 150 PPM, and losses of laser propagation in an undesired 01 mode are about 100 PPM.

5. The ring laser gyroscope of claim 1, wherein the first aperture is circular and has a diameter of 0.052 inches, and the axis of the first aperture is horizontally offset from the central axis of the polygonal ring path of the laser by 0.004 inches.

6. The ring laser gyroscope of claim 5, further comprising a second aperture in the ring laser cavity, the second aperture having an axis coincident with the central axis of the polygonal ring path of the laser and having a diameter of no less than 0.058 inches.

* * * * *